(No Model.)
W. V. FLYNN.
FLY FAN ATTACHMENT.
No. 249,917. Patented Nov. 22, 1881.
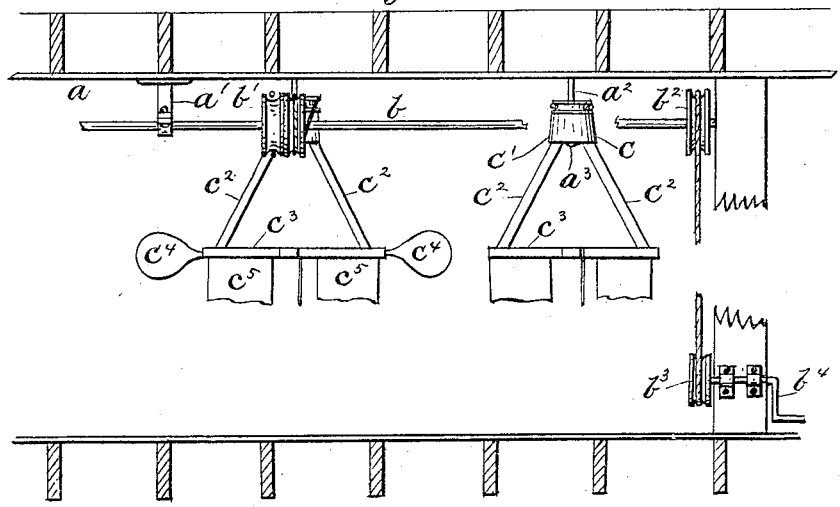
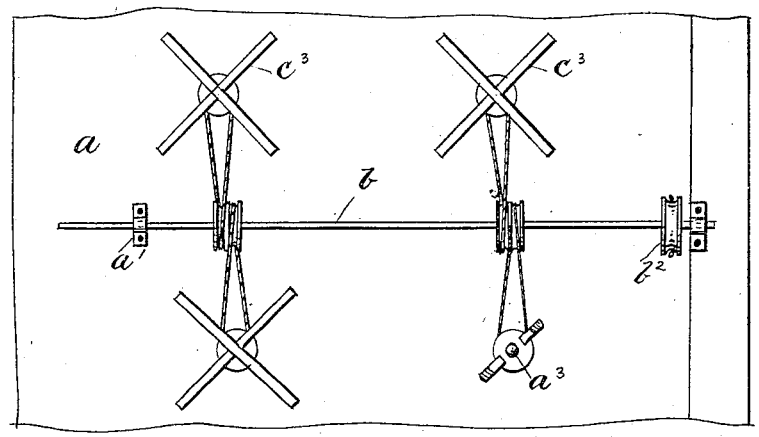
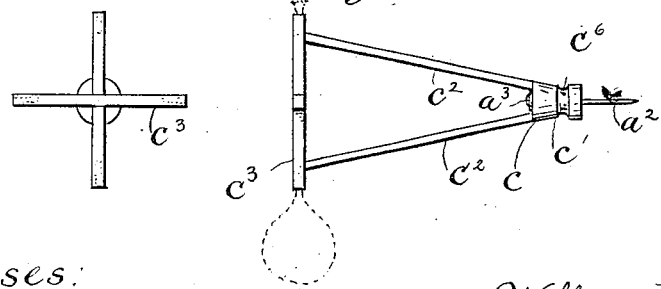
Witnesses:
N. Parker
P. B. Turpin
Inventor
William V. Flynn
By R. S. & A. P. Lacey
Att'ys

UNITED STATES PATENT OFFICE.

WILLIAM V. FLYNN, OF MORRISTOWN, TENN., ASSIGNOR OF TWO-THIRDS TO O. C. KING AND LOUISA R. FLYNN, BOTH OF SAME PLACE.

FLY-FAN ATTACHMENT.

SPECIFICATION forming part of Letters Patent No. 249,917, dated November 22, 1881.

Application filed August 23, 1881. (No model.)

*To all whom it may concern:*

Be it known that I, WILLIAM V. FLYNN, a citizen of the United States, residing at Morristown, in the county of Hamblin and State of Tennessee, have invented certain new and useful Improvements in Fly-Brushes and Ventilators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in fanning and ventilating devices for use in dining-rooms and other compartments; and it consists in the mechanism hereinafter described, and pointed out in the claim.

In the drawings, Figure 1 is a side view. Fig. 2 is an inverted plan view, and Fig. 3 shows detail views of one of the brushes and frame.

$a$ is the ceiling, to which is attached hanger or hangers $a'$, for supporting the shaft.

$b$ is the driving-shaft, supported in hangers $a'$ or other suitable bearings. It has fixed to it the pulleys $b'$, which may be arranged singly, in pairs, or in triplets, as desired, and the driving-pulley $b^2$. This pulley $b^2$ is connected, by belt or cord, with pulley $b^3$, which is operated by crank $b^4$, arranged within easy reach of the operator.

$c$ is a dependent revolving frame, consisting of the hub $c'$ and the arms $c^2$ $c^2$.

$c^3$ is a fan-frame, consisting of a series of radial arms supported on the lower ends of arms $c^2$ and revolving with the frame $c$ in a plane parallel with the ceiling. The ends of the bars $c^3$ are made with sockets for fans $c^4$, which may be fixed permanently therein, or so that they may be removed at pleasure. Thus the ordinary palm-leaf fan can be used by inserting the handle in the socket and clasping it by ordinary means. As the bars $c^3$ revolve in a plane parallel with the ceiling, the fans on their ends have a similar sweeping movement, and one follows in the track of the other.

$c^5$ are flags or streamers, which are fixed to the radial arms and hang down nearly to the heads of the persons seated at the tables below. The hub $c'$ is supported on the vertical pin $a^2$. This pin is driven into the ceiling $a$, and has on its lower end the head or knob $a^3$, which retains the hub, while it is permitted free revolution on the pin. The hub is made with the annular groove $c^6$, which provides a bearing for the belt or cord extending from the pulleys $b'$ on line-shaft $b$.

By ordinary arrangement of shafting and pulleys a brush may be arranged over each table in a large dining-room, and the whole driven by the one main line-shaft, operated as described, or in any suitable manner.

The fans serve to produce a current of air, and the flags brush the flies away from the tables.

The dependent revolving frames may be so geared with the line-shaft as to all revolve in the same direction, when a current of air will be formed from one end of the room to the other; or they may be geared so as to revolve in different directions, when eddies will be formed in the room.

The hubs may be formed with two or more channels or grooves, $c^6$, and be connected with additional brushes, so as to serve as driving-pulleys, and thus do away with the necessity of extra shafting.

Having thus described my invention, what I claim, and desire to secure by Letters Patent, is—

The combination, substantially as hereinbefore set forth, of the vertically-dependent frame $c$, consisting of the hub $c'$, provided with the channel or groove $c^6$, and supported and revolving on pin $a^2$, and the connecting-arms $c^2$, supporting the radial fan-carrying arms $c^3$, with the intermediate belting and shafting and suitable operating mechanism.

In testimony whereof I affix my signature in presence of two witnesses on this 19th day of August, 1881.

WILLIAM V. FLYNN.

Witnesses:
J. R. MILLER,
J. F. MINOR.